F. L. STAGE.
VEHICLE SIGNAL.
APPLICATION FILED JAN. 4, 1912.
1,030,027.
Patented June 18, 1912.
2 SHEETS—SHEET 1.
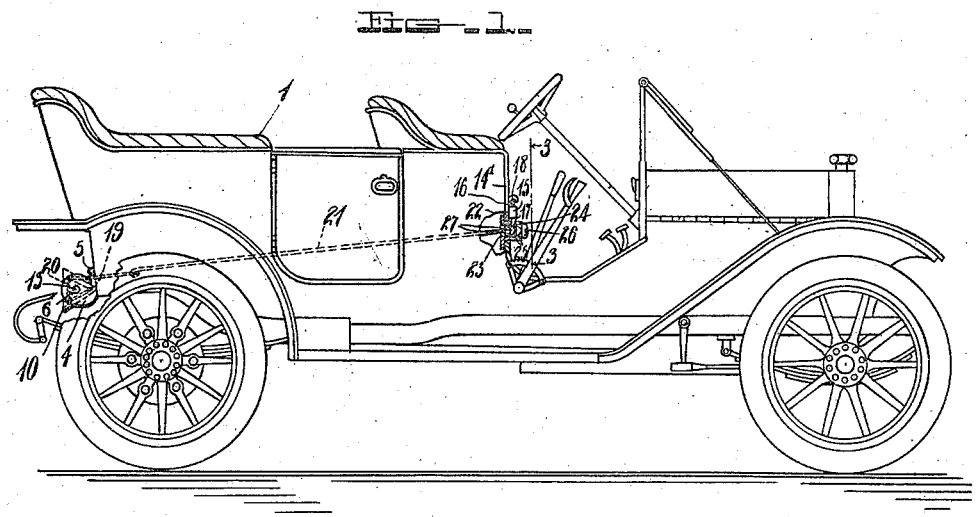
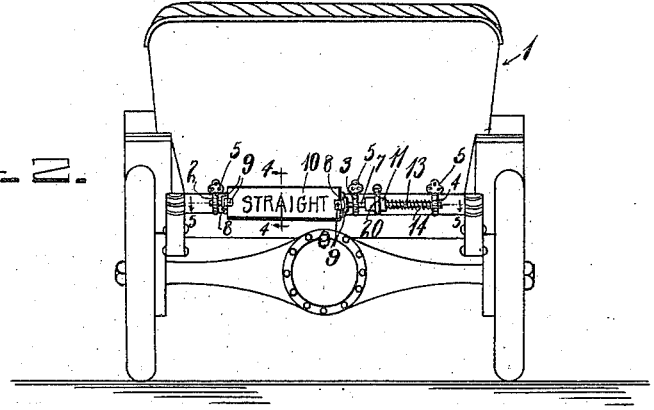
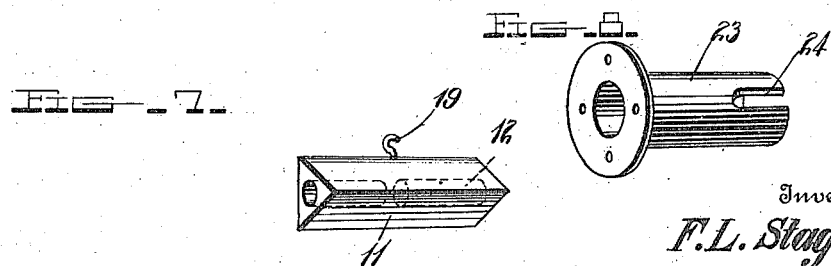
Witnesses
Inventor
F. L. Stage.
By
Attorneys F. L. STAGE.
VEHICLE SIGNAL.
APPLICATION FILED JAN. 4, 1912.
1,030,027.
Patented June 18, 1912.
2 SHEETS—SHEET 2.
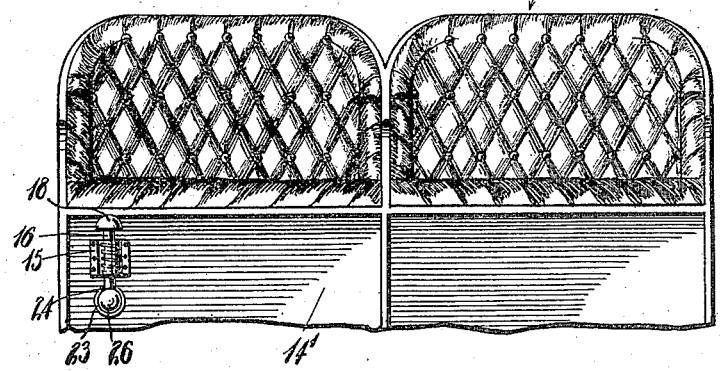
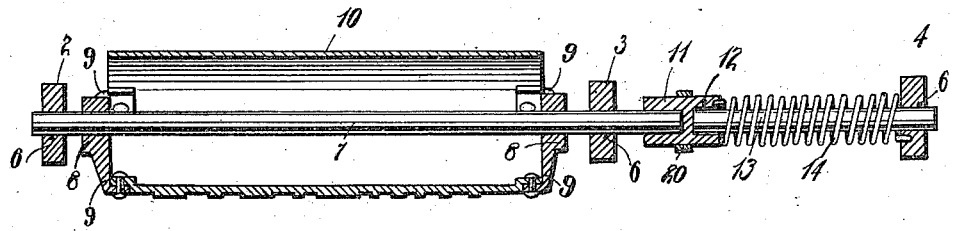
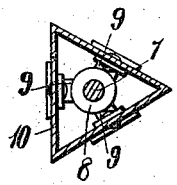
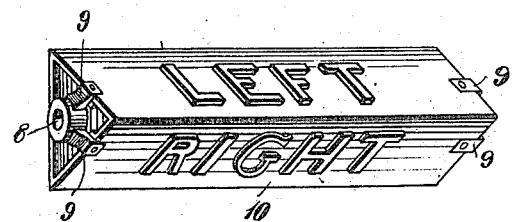
Inventor
F. L. Stage.
Witnesses
By
Attorneys

UNITED STATES PATENT OFFICE.

FLOYD L. STAGE, OF HAMBURG, NEW YORK.

VEHICLE-SIGNAL.

1,030,027.

Specification of Letters Patent.   Patented June 18, 1912.

Application filed January 4, 1912.   Serial No. 669,408.

*To all whom it may concern:*

Be it known that I, FLOYD L. STAGE, a citizen of the United States, residing at Hamburg, in the county of Erie, State of New York, have invented certain new and useful Improvements in Vehicle-Signals; and I do hereby declare the following to be a full, clear, and exact description of the invention, such as will enable others skilled in the art to which it appertains to make and use the same.

This invention has particular reference to visual signals for vehicles, and particularly motor vehicles.

The primary object of the invention is to provide a signaling device for application upon the rear of a vehicle to denote the direction of the travel of the same.

A further object of the invention is to provide a device of this character which will indicate to a driver of a following vehicle the direction the leading vehicle is about to travel or turn.

With these and other objects in view, the invention consists in certain novel features of construction, combination and arrangement of parts as will be hereinafter fully described and claimed.

In the drawings: Figure 1 is a side elevation of an automobile equipped with the device. Fig. 2 is a rear elevation of the same. Fig. 3 is a sectional view on the line 3—3 of Fig. 1. Fig. 4 is a sectional view on the line 4—4 of Fig. 2. Fig. 5 is a sectional view on the line 5—5 of Fig. 2. Fig. 6 is a perspective view of the drum. Fig. 7 is a perspective view of the operating block. Fig. 8 is a similar view of the sleeve.

Referring to the drawings, the numeral 1 designates an automobile of any construction having secured to the rear thereof depending brackets 2, 3, and 4, the upper ends of said brackets being provided with attaching flanges 5. The brackets have formed in their lower ends registering perforations 6.

Rigidly mounted upon a shaft 7, and between the brackets 2 and 3 are spaced hubs 8, having radiating therefrom spokes 9. Riveted to the outer ends of the spokes 9 is one face of a polygonal drum 10, the same being formed from sheet metal. On each of the faces of the drum is denoted by embossed letters the words "Straight", "Right", "Left", respectively. That portion of the shaft 7 which projects beyond one side of the bracket 3 is secured in a polygonal metal block 11, said projected portion of the shaft stopping at a point midway the length of said block, thus producing a bearing 12, and in which is loosely mounted the inner end of the rod 13, the outer end of said rod being similarly mounted in the perforations 6 formed in the bracket 4, it being of course understood that the shaft 7 is loosely journaled in the perforations 6 formed in the brackets 2 and 3. Surrounding the rod 13 and having its inner end secured to the outer end of the block 11 is a coil spring 14, the outer end of the same being connected to the inner face of the bracket 4 and near the lower end thereof.

Mounted upon the front board 14 of the driver's seat is a boxing 15 having slidably mounted therein a vertically disposed spring pressed locking bolt 16, the lower end of which projects slightly below the lower end of the boxing 15 and is formed with a beveled face 17, the purpose of which will hereinafter be described. Formed upon the upper end of the locking bolt 16 is an operating knob 18, and which the driver may grasp to operate the bolt.

To one of the angled edges of the polygonal block 11 is a hook 19, and to which is connected one end of a flat chain or strap 20, the other end of the strap or chain being secured to the inner end of a rod 21, said rod being extended forwardly and having its extreme outer end passed through an opening 22 formed in the front board 14, said opening being positioned adjacent the boxing 15. Mounted in the opening 22 is a sleeve 23, the upper side of which is provided with a slot 24, through which the lower end of the locking bolt 16 passes for engagement with any of the notches 25 formed upon the outer end of the rod 21 by the knob 26 and tapered enlargements 27, the beveled face 17 of the bolt being adapted to pass freely over the tapered sides of the enlargements 27 when the knob 26 is grasped by the driver and pulled forward.

The normal position of the polygonal drum 10 is such that it will display the face having the word "Straight" thereon, and at which time the beveled end of the bolt 16 is positioned in the notch 25 formed by the knob 26 and adjacent the enlargements 27. Now when it is the intention of the driver to turn to the right, the knob 26 is grasped and pulled forwardly, whereupon the bolt 16 will engage with the succeeding notch 25 and through the rod 21 and block 11 the drum 10 will be partially rotated, thus displaying the face thereof having thereon the word "Right." When it is the intention of the driver to turn to the left, the knob 26 is grasped and the rod 21 pulled forward thereby until the bolt 16 engages the succeeding notch 25, the block 11 and drum 10 will be simultaneously operated to display the drum face having thereon the word "Left." The tension of the spring 14 is such as to return the drum 10 to the position displaying the word "Straight," and at which time the bolt 16 engages the notch formed by the knob 26 and adjacent tapered portions 27, the drum 10 and block 11 being rotated only at times when it is the intention of the driver to either turn to the right or left, thus displaying to the following driver the direction of turning intended.

It is obvious from this construction that the device may be mounted upon the front of the vehicle to notify pedestrians or oncoming vehicles the direction of travel which is intended.

What is claimed is:

In a visual signaling device the combination with a vehicle, of a plurality of brackets secured to the rear thereof, a shaft rotatably mounted in the brackets, a polygonal drum rigidly connected to the shaft and between a pair of the brackets, visual signals upon the faces of the drum, a polygonal block secured to one end of the shaft, a spring having one of its ends connected to the block and its other end to one of the brackets, a strap having one end secured to the block, a rod having its inner end secured to the free end of the strap, said rod having formed upon its outer end a plurality of notches, said notched end passing through the front board of the vehicle seat, means mounted upon said front board for successively engaging said notches, whereby when said rod is moved forwardly the block and drum will be simultaneously operated against the tension of the spring upon the unwinding of the strap or chain from the block to display a signal, said spring acting to return the drum to its normal position.

In testimony whereof, I affix my signature, in presence of two witnesses.

FLOYD L. STAGE.

Witnesses:
ELIZABETH J. HAAS,
EDWARD F. HAAS.

---

Copies of this patent may be obtained for five cents each, by addressing the "Commissioner of Patents, Washington, D. C."